(12) United States Patent
Rathod et al.

(10) Patent No.: US 9,996,427 B2
(45) Date of Patent: Jun. 12, 2018

(54) PARALLEL BACKUP FOR DISTRIBUTED DATABASE SYSTEM ENVIRONMENTS

(75) Inventors: Paresh Manhar Rathod, Maharashtra (IN); Jay Gorakhnath Sudrik, Maharashtra (IN); Carlos Ruiz Muñoz, Madrid (ES); Graham William Ivey, Hook (GB)

(73) Assignee: SYBASE, INC., Dublin, CA (US)

( * ) Notice: Subject to any disclaimer, the term of this patent is extended or adjusted under 35 U.S.C. 154(b) by 39 days.

(21) Appl. No.: 13/063,432

(22) PCT Filed: Dec. 20, 2010

(86) PCT No.: PCT/ES2010/070848
§ 371 (c)(1),
(2), (4) Date: Mar. 10, 2011

(87) PCT Pub. No.: WO2012/085297
PCT Pub. Date: Jun. 28, 2012

(65) Prior Publication Data
US 2013/0262389 A1    Oct. 3, 2013

(51) Int. Cl.
  *G06F 7/00*    (2006.01)
  *G06F 17/00*   (2006.01)
  *G06F 11/14*   (2006.01)
  *G06F 17/30*   (2006.01)

(52) U.S. Cl.
  CPC ...... *G06F 11/1458* (2013.01); *G06F 11/1464* (2013.01); *G06F 11/1466* (2013.01); *G06F 17/30362* (2013.01); *G06F 17/30575* (2013.01); *G06F 17/30584* (2013.01); *G06F 2201/80* (2013.01); *G06F 2201/82* (2013.01)

(58) Field of Classification Search
None
See application file for complete search history.

(56) References Cited

U.S. PATENT DOCUMENTS

| | | | |
|---|---|---|---|
| 5,671,350 A * | 9/1997 | Wood | 714/15 |
| 5,832,508 A * | 11/1998 | Sherman | G06F 17/30368 |
| 6,487,558 B1 * | 11/2002 | Hitchcock | |
| 6,643,802 B1 * | 11/2003 | Frost et al. | 714/37 |
| 7,548,898 B1 | 6/2009 | Tarenskeen et al. | |
| 7,650,341 B1 * | 1/2010 | Oratovsky et al. | 707/999.01 |
| 7,885,923 B1 * | 2/2011 | Tawri et al. | 707/610 |

(Continued)

FOREIGN PATENT DOCUMENTS

EP    0 657 813 A1    6/1995

OTHER PUBLICATIONS

International Search Report and the Written Opinion of the International Searching Authority for International Patent Application No. PCT/ES2010/070848, European Patent Office, Rijswijk, Netherlands, dated Jul. 5, 2011.

*Primary Examiner* — David T. Brooks
(74) *Attorney, Agent, or Firm* — Sterne, Kessler, Goldstein & Fox P.L.L.C.

(57) ABSTRACT

The capability to perform data backup and restore within a distributed database system environment is provided. The embodiments includes initiating a backup operation of a database distributed across a plurality of nodes, and coordinating synchronization of the backup operation within and among the plurality of nodes for parallel, local data dumping with transactional consistency to a single point in time.

11 Claims, 8 Drawing Sheets

(56) References Cited

U.S. PATENT DOCUMENTS

| | | |
|---|---|---|
| 8,150,805 B1 * | 4/2012 | Tawri et al. .................. 707/629 |
| 8,326,803 B1 * | 12/2012 | Stringham .................... 707/652 |
| 2004/0010502 A1 * | 1/2004 | Bomfim et al. .............. 707/100 |
| 2004/0153615 A1 * | 8/2004 | Koning ............... G06F 11/1464 711/162 |
| 2005/0120025 A1 | 6/2005 | Rodriguez et al. |
| 2006/0026161 A1 | 2/2006 | Henseler |
| 2006/0271601 A1 * | 11/2006 | Fatula et al. .................. 707/201 |
| 2007/0214196 A1 * | 9/2007 | Garimella et al. ............ 707/204 |
| 2007/0239797 A1 * | 10/2007 | Cattell et al. ................. 707/201 |
| 2007/0288530 A1 * | 12/2007 | Romem et al. ............... 707/202 |
| 2009/0012932 A1 * | 1/2009 | Romem .................. G06F 11/18 |
| 2009/0157775 A1 * | 6/2009 | Pederson .......... G06F 17/30309 |
| 2009/0172051 A1 * | 7/2009 | Huffman ........... G06F 17/30368 |
| 2009/0193094 A1 * | 7/2009 | Scholl ....................... G06F 9/52 709/207 |
| 2011/0072217 A1 * | 3/2011 | Hoang et al. ................. 711/130 |
| 2011/0082832 A1 * | 4/2011 | Vadali ................. G06F 11/1451 707/615 |
| 2011/0246425 A1 * | 10/2011 | Munoz ......................... 707/640 |

\* cited by examiner

600

| Node Slice | N1 | N2 | N3 | N4 | N5 | N6 |
|---|---|---|---|---|---|---|
| S1 | RW | RO | RO | | | |
| S2 | RO | RW | RO | | | |
| S3 | RO | RO | RW | | | |
| S4 | RW | RO | RO | | | |
| S5 | RO | RW | RO | | | |
| S6 | RO | RO | RW | | | |
| S7 | | | | RW | RO | RO |
| S8 | | | | RO | RW | RO |
| S9 | | | | RO | RO | RW |
| S10 | | | | RW | RO | RO |
| S11 | | | | RO | RW | RO |
| S12 | | | | RO | RO | RW |

FIG. 6

PARALLEL BACKUP FOR DISTRIBUTED DATABASE SYSTEM ENVIRONMENTS

BACKGROUND

Field

The present invention relates generally to databases, particularly to improving database performance and scalability for distributed database system environments.

Background

High-performance enterprise applications often encounter performance bottlenecks and scalability problems when trying to access data stored in a database. Traditionally, databases have used disk-based storage devices to store data. However, disk access can be very slow. To improve database performance, main memory has been used as a data buffer or cache for data stored on disk. To further improve performance and resolve scalability issues, particularly for large enterprise applications, development of a distributed caching system, which combines the scalability of distributed systems with the reduced access latency of main memory, is occurring.

While such systems are capable of improving performance, challenges exist for ensuring the necessary functionality. One particular issue for distributed data spread across different cache nodes up is how to achieve backup and restore that needs to occur up to a transactionally consistent single point in time, in parallel, and while allowing online transactions during the backup. The present invention addresses such needs.

BRIEF SUMMARY

The capability to perform data backup and restore within a distributed database system environment is provided. The embodiments includes initiating a backup operation of a database distributed across a plurality of nodes, and coordinating synchronization of the backup operation within and among the plurality of nodes for parallel, local data dumping with transactional consistency to a single point in time.

Embodiments may be implemented using hardware, firmware, software, or a combination thereof and may be implemented in one or more computer systems or other processing systems.

Further embodiments, features, and advantages of the present invention, as well as the structure and operation of the various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the information contained herein.

BRIEF DESCRIPTION OF THE DRAWINGS/FIGURES

Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number.

FIG. 6 is a table illustrating an example of distributing ownership rights for multiple nodes based on round-robin slice teams, according to an embodiment.

Figure 1:
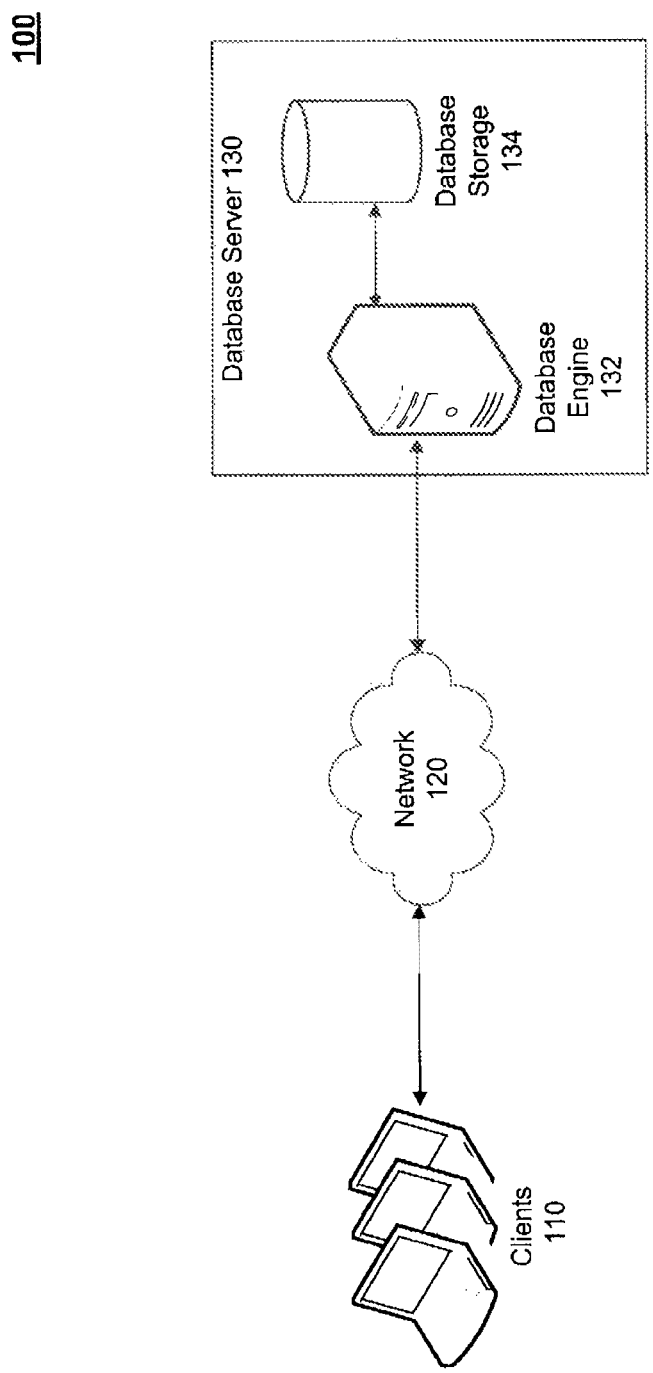
FIG. 1 is a diagram of an exemplary database system.

The accompanying drawings, which are incorporated herein and form part of the specification, illustrate the embodiments of present invention and, together with the description, further serve to explain the principles of the invention and to enable a person skilled in the relevant art(s) to make and use the invention.

DETAILED DESCRIPTION

Table of Contents
I. Database System
II. Data Grid
III. Data Grid Backup
IV. Method
V. Example Computer System Implementation
VI. Conclusion Embodiments relate to data backup and restore for a distributed database system environment. The following description refers to a distributed cache-based database environment where the embodiments of the present invention find application, but it should be appreciated that this is meant as exemplary and not restrictive of the type of distributed database environment for application of the aspects of the present invention.

Thus, while the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The term "in-memory database," or "IMDB," is used herein to refer broadly and inclusively to any database management system that primarily relies on main memory, rather than a disk-based mechanism, to store and manage data. In addition, such IMDBs typically reside entirely within main memory. A person skilled in the relevant art given this description would appreciate that IMDBs are generally faster than databases that rely on disks for storage.

I. DATABASE SYSTEM

Databases commonly organize data in the form of tables, each table having a number of rows and columns. Each table generally has a number of rows and columns, and each row in a table generally has a data value associated with each of the columns. This intersection of rows and columns is commonly referred to as a cell. A system needing access to data in the database typically issues a request in the form of a query. A query usually involves a request for the data contained in one or more cells of any rows that meet a particular condition. This condition often involves the comparison of the values of cells in a column to some other value to determine whether the row associated with the compared cell meets the condition.

FIG. 1 is a diagram of an exemplary database system. Database system 100 includes one or more clients 110, a network 120, and a database server 130. The database server 130 includes a database engine 132 and database storage 134.

Clients 110 are operable to send requests for data, commonly in the form of a database queries, to database server 130 over network 120. Database server 130 replies to each request by sending a set of results, commonly in the form of result rows from a database table, to clients 110 over network 120. One skilled in the relevant art given this description will appreciate that any data format operable to convey a request for data and a reply to the request may be used. In accordance with an embodiment, the requests and replies are consistent with the conventions used in the Structured Query Language ("SQL"), although this example is provided solely for purposes of illustration and not limitation.

Clients 110 can each be any type of computing device having one or more processors, a user input (for example, a mouse, QWERTY keyboard, touch-screen, microphone, or a T9 keyboard), and a communications infrastructure capable of receiving and transmitting data over a network. For example, clients 110 can include, but are not limited to, a mobile phone, a personal digital assistant (PDA), a computer, a cluster of computers, a set-top box, or other similar type of device capable of processing instructions and receiving and transmitting data to and from humans and other computing devices.

Similarly, database server 130 may be implemented on any type of computing device. Such a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

Network 120 can be any network or combination of networks that can carry data communication. Such network can include, but is not limited to, a wired (e.g., Ethernet) or a wireless (e.g., Wi-Fi and 3G) network. In addition, network 120 can include, but is not limited to, a local area network, medium area network, and/or wide area network such as the Internet. Network 120 can support protocols and technology including, but not limited to Internet or World Wide Web protocols and/or services. Intermediate network routers, gateways, or servers may be provided between components of database system 100 depending upon a particular application or environment.

When a request for data, such as a query, is received by database server 130, it is handled by database engine 132, in accordance with an embodiment of the present invention. Database engine 132 is operable to determine the data requested by the query, obtain the data, and provide a reply to the query. One skilled in the relevant an given this description will appreciate that while database engine 132 is illustrated as a single module in database system 100, database engine 132 may be implemented in a number of ways in order to accomplish the same function. Accordingly, the illustration of modules in database server 130 is not a limitation on the implementation of database server 130.

Database engine 132 is operable to obtain the data in response to the query from database storage 134. Database storage 134 stores values of a database in a data structure. Typically, database values are stored in a table data structure, the table having data rows and columns. At the intersection of each row and column is a data cell, the data cell having access to a data value corresponding to the associated row and column. Each column normally has an associated data type, such as "string" or "integer," which is used by database engine 132 and clients 110 to interpret data contained in a data cell corresponding to the column. The database often comprises multiple tables.

Additionally, database storage 134 comprises alternate means of indexing data stored in a table of a database. Database engine 132 is operable to analyze a query to determine whether an available alternate means is useful to better access the data stored in a table, and then utilizes this alternate means to obtain data from the table.

Further, database storage 134 may be implemented as a relational database and database engine 132 may be implemented using a relational database management system (RDBMS). An example of such a RDBMS is, for example and without limitation, Adaptive Server Enterprise (ASE) from Sybase, Inc. of Dublin, Calif. A person skilled in the relevant art given this description would appreciate that embodiments may be operable to work with any RDBMS.

II. DATA GRID

Figure 2:
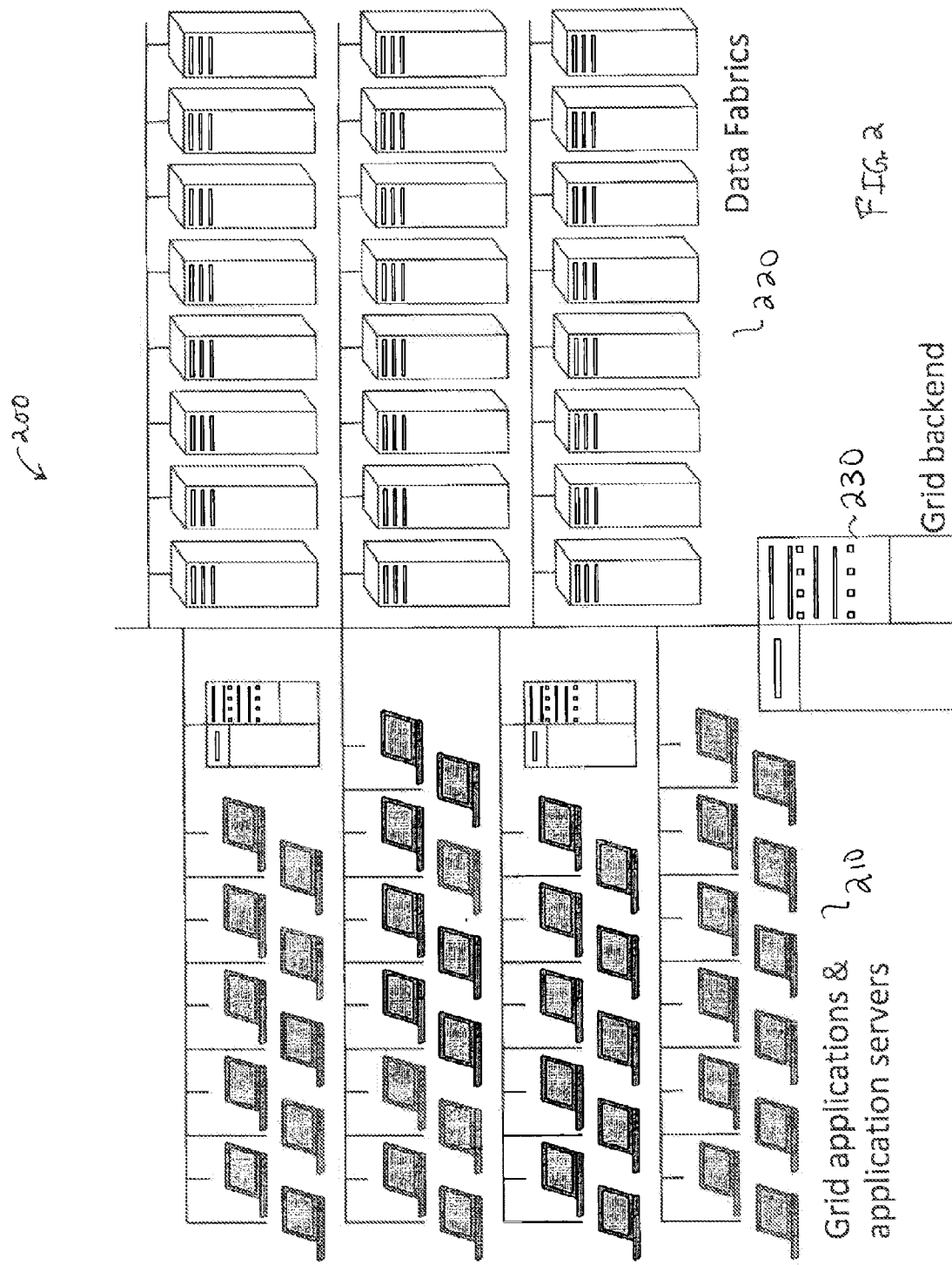
FIG. 2 is an architecture diagram of an exemplary data grid in a database environment, according to an embodiment.

FIG. 2 is an architecture diagram of an exemplary data grid 200 in a database environment, according to an embodiment of the present invention. The use of a data grid as described herein is intended to provide improved performance and scalability through the interaction of several mechanisms. A key mechanism is a set of clustered cache nodes, linking clients to database servers in a data fabric configuration.

Data grid 200 includes grid applications 210, data fabrics 220, and a grid backend 230, according to an embodiment. Although multiple data fabrics 220 are shown, data grid 200 can have a single data fabric. In an embodiment, each data fabric (e.g., data fabric 220) within data grid 200 is a clustered memory cache comprising multiple cache nodes, which are configured to store all or portions of data in a database system.

For ease of explanation, data grid 200 will be described in the context of database system 100 of FIG. 1, but is not intended to be limited thereto. In an embodiment, the various components of data grid 200, including grid applications 210, data fabric 220, and grid backend 230, are communicatively coupled to each other via, for example, a network (e.g., network 120 of FIG. 1).

In an embodiment, data grid 200 comprises an architecture built around a distributed in-memory database (IMDB) cache that is clustered on multiple physical machines. Such a clustered IMDB cache provides a responsive transaction-performance model for processing query transactions to and from client applications (e.g., executed by clients 110 of FIG. 1) and a database server (e.g., database server 130 of FIG. 1). As will be described in further detail below, the clustered IMDB cache of data grid 200 allows for scale-out on multiple database servers. It should be noted that data grid 200 is not simply a mid-tier cache between client applications 210 and grid backend 230. Thus, in contrast to conventional caching systems, data grid 200 can continue to seamlessly process transactions even in the absence of grid backend 230, as described in further detail below.

In an embodiment, grid applications 210 may be any type of client application that connects to any of the cache nodes of data fabric 220 for purposes of optimizing transaction performance and/or scale-out. For example, grid applications 210 may be one or more time-sensitive enterprise client applications that require reduced access latency and fast query response times. Grid applications 210 may be hosted, for example, on one or more computing devices, for example, clients 110 of FIG. 1. In an embodiment, grid applications 210 send transaction queries to data grid 200 over a network, for example, network 120 of FIG. 1. Grid applications 210 can be implemented in software, firmware, hardware, or a combination thereof. Further, grid applications 210 can also be implemented as computer-readable code executed on one or more computing devices capable of carrying out the functionality described herein. As noted above, examples of computing devices include, but are not limited to, clients 110 of FIG. 1.

In an embodiment, grid backend 230 is an enterprise-class relational database and relational database management system (RDBMS). As noted above, an example of such a RDBMS is, for example and without limitation, Adaptive Server Enterprise (ASE) from Sybase, Inc. of Dublin, Calif. Grid backend 230 may be implemented using, for example, database server 130 of FIG. 1.

In an embodiment, data grid 200 comprises an architecture built around a distributed in-memory database (IMDB) cache that is clustered on multiple physical machines. Such a clustered IMDB cache provides a responsive transaction-performance model for processing query transactions to and from client applications (e.g., executed by, clients 110 of FIG. 1) and a database server (e.g., database server 130 of FIG. 1). As will be described in further detail below, the clustered IMDB cache of data grid 200 allows for scale-out on multiple database servers. Such database servers can be implemented using any computing device having at least one processor and at least one memory device for executing and storing instructions. Such a memory device may be any type of recording medium coupled to an integrated circuit that controls access to the recording medium. The recording medium can be, for example and without limitation, a semiconductor memory such as random-access memory (RAM), high-speed non-volatile memory, or other similar type of memory or storage device. Further, cache nodes of data fabric 220 may be communicatively coupled to each other and one or more other devices within the database system via, for example, a high-speed network or communications interface.

Figure 3:
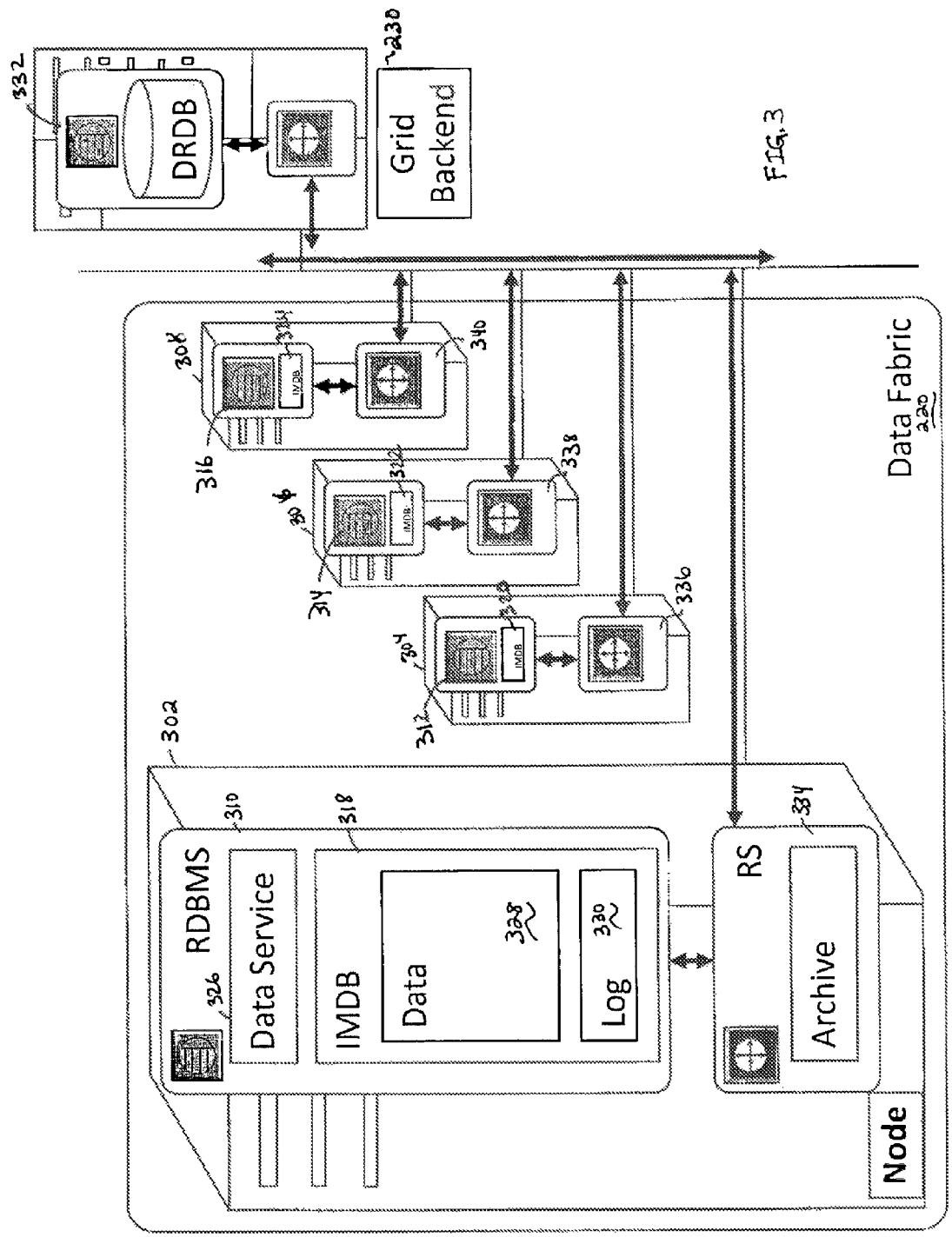
FIG. 3 is a diagram illustrating a data fabric and backend of the data grid of FIG. 2, according to an embodiment.

Referring now to FIG. 3, a block diagram of a data fabric 220 is illustrated depicting an example having four cache nodes 302, 304, 306, and 308. Although only four cache nodes are shown, more or fewer cache nodes may be utilized. As shown, each cache node of the data fabric 220 is communicatively coupled to the grid backend 230.

In an embodiment, the processing of query transactions via the cache nodes 302, 304, 306, and 308 occurs by the RDBMS functionality (e.g., ASE) of the each cache node, 310, 312, 314, and 316. IMDBs 318, 320, 322, 324, respectively, provide the database cache structure of each cache node implemented using one or more memory devices. An example of a suitable basis for providing an IMDB in an ASE embodiment is described in co-pending U.S. patent application Ser. No. 12/726,063, entitled "In-Memory Database Support" assigned to the assignee of the present invention and incorporated herein by reference.

In an embodiment, cache nodes 302, 304, 306, 308 contain backend data cached from grid backend 230 at startup. All or a portion of the backend data stored in the disk resident database (DRDB) 332 of grid backend 230 may be copied initially to data fabric 220 at startup. In another embodiment, data fabric 220 can be started up without copying backend data from grid backend 230. For example, data fabric 220 may load the respective contents of cache nodes 302, 304, 306, 308 with pre-configured template files. Such template files may contain relevant enterprise data and be stored at, for example, any storage device within the database system accessible by data fabric 220. A person skilled in the relevant art given this description would appreciate the format and contents of such a template file.

In yet another embodiment, the data loaded into the cache nodes of data fabric 220 may be from grid applications 210 (FIG. 2). For example, grid applications 210 may connect to cache nodes 302, 304, 306, 308 to store and manage data directly therein. Such application data may be coherent across cache nodes 302, 304, 306, 308 without having any corresponding backend data or data local to a particular cache node within data fabric 220. A person skilled in the relevant art would appreciate that data grid 200 may employ one or more data services 326 of a node that facilitate transaction processing between grid applications 210 and data grid 200, where each IMDB also includes a data storage portion 328 and a log storage portion 330 to support the transaction processing by the node.

Although shown as a component of data grid 200 in FIG. 2, it should be noted that grid backend 230 can be an optional component for data grid 200, according to an embodiment. Thus, the processing of data within data grid 200 and data fabric 220) may not depend on the presence of grid backend 230. Accordingly, grid backend 230 can be connected and disconnected to and from data grid 200 as may be necessary for given application. For example, cache nodes 302, 304, 306, 308 may be implemented using volatile memory, and data fabric 220 may be configured to start without any initial backend data or store only temporary or transient data that does not need to be stored for later use. Further, if cached data stored at data fabric 220 needs to be persisted at shutdown, data fabric 220 may be configured to automatically save its contents to another persistent or non-persistent storage location. Such storage location may be, for example, a disk-based storage device or another backend database communicatively coupled to data grid 200 in the database system.

Alternatively, if data fabric 220 holds only transient data, it may be simply shut down without requiring the presence of a backend. It would be apparent to a person skilled in the relevant art given this description that such transient data is commonly used in high performance computing (HPC) type applications. It would also be apparent to a person skilled in the relevant art given this description that grid application 210 can include such HPC-type applications, but are not limited thereto.

It would be apparent to a person skilled in the relevant art given this description that implementing data grid 200, as described herein, within a database system would provide significant performance gains for processing transactions. One particular issue for such a system is providing the ability to backup all the cached databases. Applying a dump/load mechanism to backup and restore a backend database as exists in a typical backend database would require the use of a separate restore site. In accordance with the embodiments of the present invention, more efficient fabric backup is provided with the backup occurring in parallel, in an online mode, to a single point of time, and with transactional consistency.

III. DATA GRID BACKUP

In order to describe how a backup process within a distributed database environment, such as a grid system, operates in accordance with an embodiment of the present invention, further details on the manner in which data is stored within such a data fabric 200 are presented first.

Resource constraints associated with data grid 200, including data fabric 220, include, but are not limited to, one or more database schemas, hardware resource limits, and the type of database granularity. Hardware resource limits can be any type of hardware limitation associated with one or more data fabrics of data grid 200. Examples of such hardware resource limits include, but are not limited to, the total number of caches nodes within data fabric 220 and the memory size of each cache node. Such hardware resource limits may be input, for example, by a database administrator or database application developer.

In an embodiment, database or table granularity objectives for data grid 200 may also be specified. In an embodiment, cache nodes 302, 304, 306, 308 of data fabric 220 may be associated with two different types of databases: a fabric database (Fab-DB) or a node database (Node-DB). A Fab-DB is global to data fabric 220 and data consistency is automatically maintained across cache nodes 302, 304, 306, 308 in accordance with an embodiment of the invention. It is redundantly stored for high-availability (HA) and scalability on several associated read-only (RO) nodes. In contrast, a Node-DB is local to a cache node and it may or may not be present at other cache nodes. No data consistency is maintained across the nodes for a Node-DB database, in an example, all system-specific databases are Node-DBs, and all cached user databases are Fab-DBs. A person skilled in the relevant art would appreciate that these designations are provided for illustrative purposes and embodiments are not limited thereto. In a further embodiment, a Fab-DB can have any of three levels of granularity: database granularity, table granularity, or partition granularity.

1. Database Granularity Data Fabric

In an example, a database from grid backend 230 (e.g., backend database 332) may be entirely cached as a. Fab-DB in data fabric 220 for database granularity. Identical replicas of the Fah-DB are cached on cache nodes 302, 304, 306, 308. One node is designated as the read-write (RW) owner where data may be both read and written. The other nodes would accordingly hold read-only (RO) copies of the database. Further, any data modifications can be asynchronously propagated from the RW owner to the RO nodes, in accordance with embodiments.

2. Table Granularity Data Fabric

In another example, one or more database tables from grid backend 230 (e.g., backend database 232) may be entirely cached as Fab-DB tables in data fabric 220 for table granularity, Identical replicas of the Fab-DB tables are cached on cache nodes 302, 304, 306, 308. One node is designated as the read-write (RW) owner where data may be both read and written. The other nodes would accordingly hold read-only (RO) copies of the tables. Further, similar to database granularity, any data modifications can be asynchronously propagated from the RW owner to the RO nodes, in accordance with embodiments.

3. Partition Granularity Data Fabric

In yet another example, portions of a backend database from grid backend 230 may be cached in data fabric 220 for a partition granularity, in an embodiment, the portions of the backend database can be distributed or sliced across cache nodes 302, 304, 306, 308 of data fabric 220. The slicing of the data from the backend database is done across the primary-foreign key inter-table relationship, so that any point query can be fully executed on any single cache node of data fabric 220. A set of tables that are connected by primary-foreign key constraints is referred to herein as a database tree schema (or simply "tree schema"). Each database tree schema has a root table and a set of child tables. A table is a child table if it has a foreign key referring to its parent. A tree schema can have several levels of child tables, making it a tree hierarchy.

Figure 4:
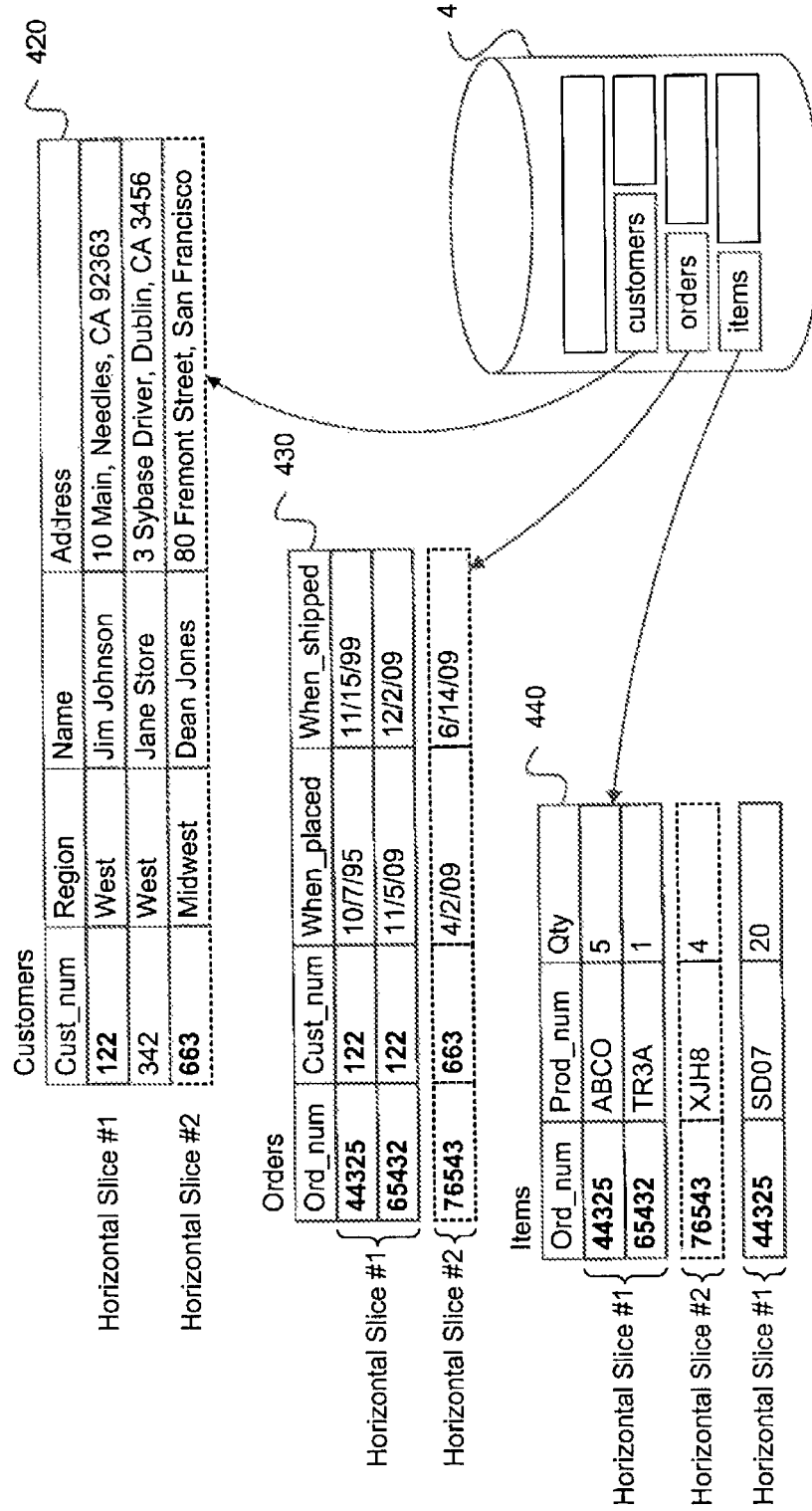
FIG. 4 illustrates an exemplary database tree schema, according to an embodiment.

Referring now to FIG. 4, FIG. 4 illustrates an exemplary database tree schema 400, according to an embodiment. The example tree schema 400 includes a backend database 410, which may be any backend database within grid backend 230, Backend database 410 includes a customers table 420, an order table 430, and an items table 440. A person skilled in the relevant art given this description would appreciate that the database and tables are provided for illustrative purposes only and embodiments are not limited thereto.

In the example illustrated in FIG. 4, customers table 420 is the root table of this hierarchy. It has a primary key on cust_num, is the customer number. Orders table 430 has multiple orders per customer and has a foreign key constraint on the cust_num column. At the same time, it has a primary key of ord_num. For example, each order within orders table 430 can have several items and hence items table 440 is connected to orders table 430 on the foreign key constraint ord_num, while having a primary key of its own on prod_num. In this example, customers table 420, orders table 430, and items table 440 form tree schema 400 with customers table 420 at the root, orders table 430 a child of customers table 420 and items table 440 a child of orders table 430. When adopting such a tree schema into data grid 200, the child tables must include the primary key of the root table in its primary key, making it a composite key. For example, orders table 430 may need to have a primary key on (ord_num, cust_num).

Further, a subset of the backend database tables that form a tree schema can be sliced across a set of horizontal virtual partitions. Each such horizontal slice is stored on a cache node of data fabric 220. Such cache node (e.g., any one of cache nodes 302, 304, 306, 308) would have full and exclusive ownership of the data (both RW and RO). It should be noted that the corresponding backend data within backend database 410 may still be partitioned differently or un-partitioned. An advantage of the above-described data fabric layout offers excellent relational data scale-out to grid applications 210.

Figure 5:
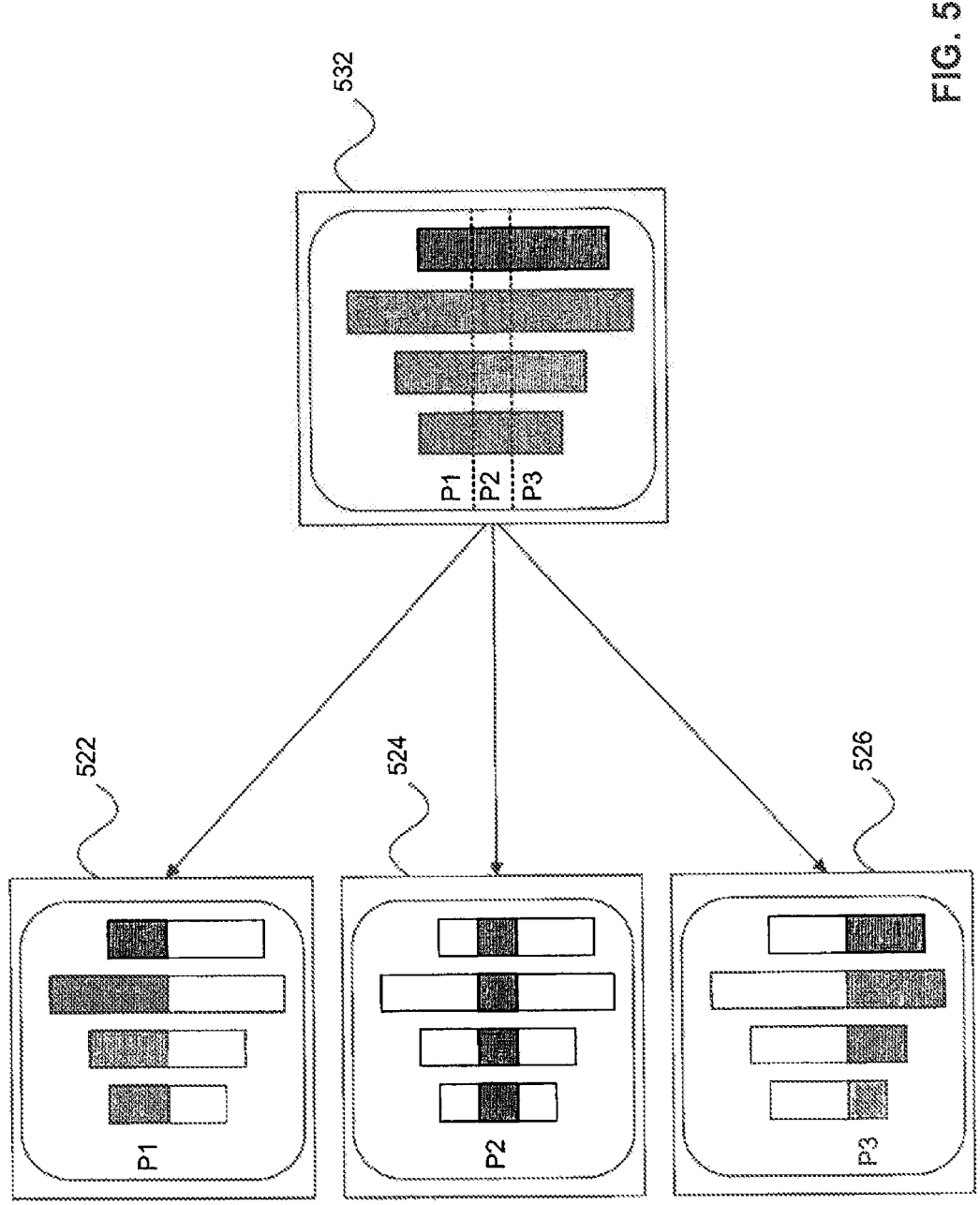
FIG. 5 is a diagram illustrating an example of splitting horizontal partitions from a set of tables across multiple nodes for a data fabric having table partition granularity, according to an embodiment.

FIG. 5 is a diagram illustrating an example of splitting horizontal partitions (P1, P2, and P3) from a set of tables within backend database 532 across cache nodes 522, 524, and 526 within data fabric having partition granularity, according to an embodiment. Such data fabric may be implemented using, for example, data fabric 220 of FIG. 2 and cache nodes 522, 524, and 526 may be implemented using cache nodes 304, 306, and 308, described above. Backend database 532 may be implemented using, for example, backend database 232, described above. In the example illustrated in FIG. 5, four tables from backend database 532 belong to a tree schema (e.g., tree schema 400 of FIG. 4, described above) and are partitioned. It should be noted that each partition (P1, P2, and P3) may be stored on one or several cache nodes within the data fabric.

For a data fabric layout based on partition granularity, multiple slices are put into slice teams and multiple cache nodes are put into node sets, according to an embodiment. A person skilled in the relevant art given this description would appreciate that any number of well-known methods may be used to distribute slice teams on node sets. One example is to use a round-robin format for distributing RO and/or RW ownership of cache nodes based on multiple slice teams.

FIG. 6 is a table 600 illustrating an example of distributing ownership rights for multiple nodes based on round-robin slice teams, according to an embodiment. In the example shown in table 600, a data fabric layout with twelve slices on six cache nodes is used. Two slice teams and two sets of nodes are formed.

IV. METHOD

As described, a fabric, essentially has various data slices organized and stored on IMDB databases across different cache nodes. In accordance with an embodiment, backup for a distributed database environment, such as the fabric, involves backing up the IMDB databases that hold the various data slices in parallel and generating separate backup copies. In the following, the features of the embodiments are described with reference to terms associated with generally understood approaches to a dump database operation in a DRDB, particularly with reference to an ASE environment. It should be appreciated that this is meant as illustrative and not restrictive of the aspects of the embodiments.

Generally, a dump database operation in an ASE DRDB involves three phases, namely, a database page phase, a flushed pages phase, and a, scan log phase. In the database page phase, a backup server scans the database devices and copies them to archive media. In the flushed pages phase, pages changed as part of the unlogged/minimally logged operations during the database page phase are sent to the backup server for copying them to archive media. In the scan log phase, logical log pages are copied by the backup server to archive media according to marked boundaries up to an end marker.

In accordance with an embodiment, in the context of a distributed database environment backup, such as data fabric 220 backup, each node performing a 'dump database' operation is serviced by a local backup server with additional coordination among the nodes to create a dump image of all the databases up to a single point in time, where all the dump operations acquire a 'Dump Instant' in a synchronized manner, in the example data grid environment, the local backup server is represented as RS 334, 336, 338, 340 in FIG. 3, which in an exemplary ASE environment comprises Replication Server from Sybase, Inc. of Dublin, Calif. In an embodiment, one of the nodes coordinates the synchronization with all other nodes performing 'dump database' operation in order to supplement "dump database" processing for achieving a backup in an efficient and reliable manner.

Figure 7:
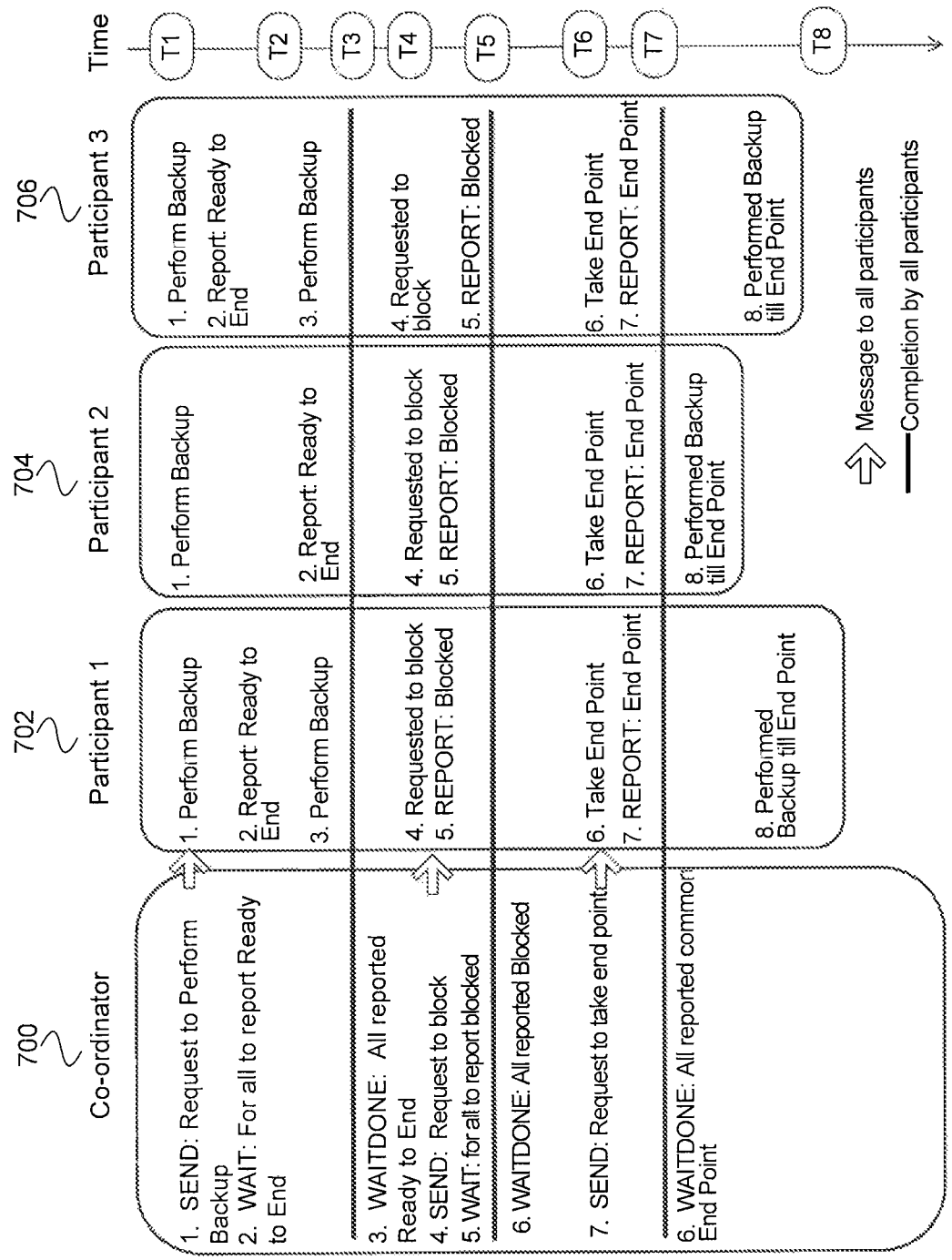
FIG. 7 is a diagram of an exemplary method for data backup, according to an embodiment.

FIG. 7 provides a diagram to further illustrate the coordination and synchronization for the example fabric backup in accordance with an embodiment of the present invention. For ease of explanation, consider that there are three nodes/participants intended to have a transactionally consistent backup (or dump). Of course, for a given fabric, the number of participants can vary to be more than or less than three, as is well appreciated by those skilled in the art. A coordinator 700 (e.g., node 302, FIG. 3) initiates the backup process and sends a request to each participant 702, 704, 706 (e.g., nodes 304, 306, 308, FIG. 3) to perform backup. Each participating cache node performs the database pages phase of the 'dump database' operation until the 'dump database' operation on each participating cache node indicates that it has finished database pages phase. Thus, each participant 702, 704, 706 can convey that it is ready to end and report back at individual times.

As shown, participants that have already reported 'Ready to End' status do not just wait for other participants to catch-up. The participants continue with backing up data that gets generated with online activity happening in parallel, e.g., the backup process is not blocked for participants 702 and 706 during time T1 and T3. In this manner, any cache node finished with the database pages phase would not be blocked and can continue sending pages that are modified to the backup server to perform the flushed pages phase of the 'dump database' operation. In an embodiment, only pages modified as part of unlogged/minimally logged operations are sent, but expansion to allow sending pages modified as part of any operation is an alternative possibility. Hence, both the online activity as well as the 'dump database' operation are not blocked while waiting for all the cache nodes to finish the database pages phase. This phase is likely to be very minimal with few data pages to be backed up, since each participant performing a backup marks the end of the database pages phase substantially simultaneously based on the guidance from the coordinator, thus ensuring that the flushed pages phase is minimal.

After all the nodes finish the database pages phase and flushed pages phase, the backup proceeds by draining the transactions that are already prepared and blocking any new transactions on all cache nodes performing 'dump database' operation. Thus, the coordinator 700 collects the 'Ready to End' status of all participants 702, 704, 706, at time T3 and guides them to proceed to the next operation by sending a request to block online activity. By time T5, each participant 702, 704, 706 has blocked online activity and reported back as 'Blocked' to the coordinator 700 before waiting for further instructions from coordinator 700. At this point, online activity (i.e., all of the transactions) is blocked at all the nodes. If feasible, transactions blocking occurs at commit phase. Alternatively, transactions can be blocked at log write phase.

Once the coordinator 700 collects the 'Blocked' status of all the participants, it guides them to take an 'End Point' by sending a message. In response, each participant 702, 704, 706 takes an 'End Point' and reports back to the coordinator 700. Once a common 'End Point' marker is indicated for all participants, the online activity is unblocked at all nodes, and all participating cache nodes 702, 704, 706 proceed with the scan log phase of the 'dump database' operation till the 'End Point', For example, as illustrated, a common 'End Point' is established at T6 by all three participants such that there is minimal online activity blocking (time T4-T7). All the participants backup until single common time T6. All the data corresponding to transactions committed before and after T6 are captured, and the incomplete transactions at time T6 are rolled back.

In implementation, for the example fabric environment, a command is issued to dump a fabric (e.g., by an application user). For example, in an ASE environment, a command such as sybfabric -Usa -P -S SYBASE —dump dump_file_name—fabric fabric_name can be input for backup of nodes that are associated with the given fabric 'fabric_name'. For optimization, the 'dump database' operations of a node having an IMDB database with only a RO data slice may be skipped. Further, striping can be allowed, with each cache node needing to use the same number of stripes, as is well appreciated by those skilled in the art. An option to define a fabric level 'dump location' may be provided, which, if set, acts as a container of the dump image files, using the user-supplied 'dump_file_name' as a label and construction of an absolute pathname of 'dump_filename' for each RW node based on some internal naming convention, such as by using a combination of 'dump location', user supplied 'dump_file_name; fabric name', 'cache node name' and 'database name'.

Of course, once the data is backed-up, restoration generally follows. In accordance with an embodiment, a standard 'load database' operation on each IMDB database is utilized by the local backup servers of each of the cache nodes in parallel without requiring any synchronization. Preferably, the RO data slices are rematerialized from the RW slices after the 'load database' operation to reduce the restore time.

By way of example, in implementation another command is issued by a user to restore a fabric. For example, in an ASE environment, a suitable command format is represented by sybfabric -Usa -P -S SYBASE —load dumpfile_name —fabric fabric_nam. All IMDB databases that are associated with given fabric 'fabric_name' that exists at various cache nodes are restored using existing "load database" operations of the backup server functionality of the nodes, as is well appreciated by those skilled in the art.

Thus, through the backup process in accordance with embodiments of the present invention, all the databases on various nodes within a distributed database environment are ensured to be backed up to a transactionally consistent single point in time with minimal intrusiveness, where the online activity across various nodes, is blocked very minimally, if at all, during the backup operation. Multiple node data is dumped in parallel, and with each dump operation serviced by a local backup server for that node, dump data is stored locally. Thus, the backup data does not have to be transferred across the network.

V. EXAMPLE COMPUTER SYSTEM IMPLEMENTATION

Aspects of the present invention shown in FIGS. 1-7, or any part(s) or function(s) thereof, may be implemented using hardware, software modules, firmware, tangible computer readable media having instructions stored thereon, or a combination thereof and may be implemented in one or more computer systems or other processing systems.

Figure 8:
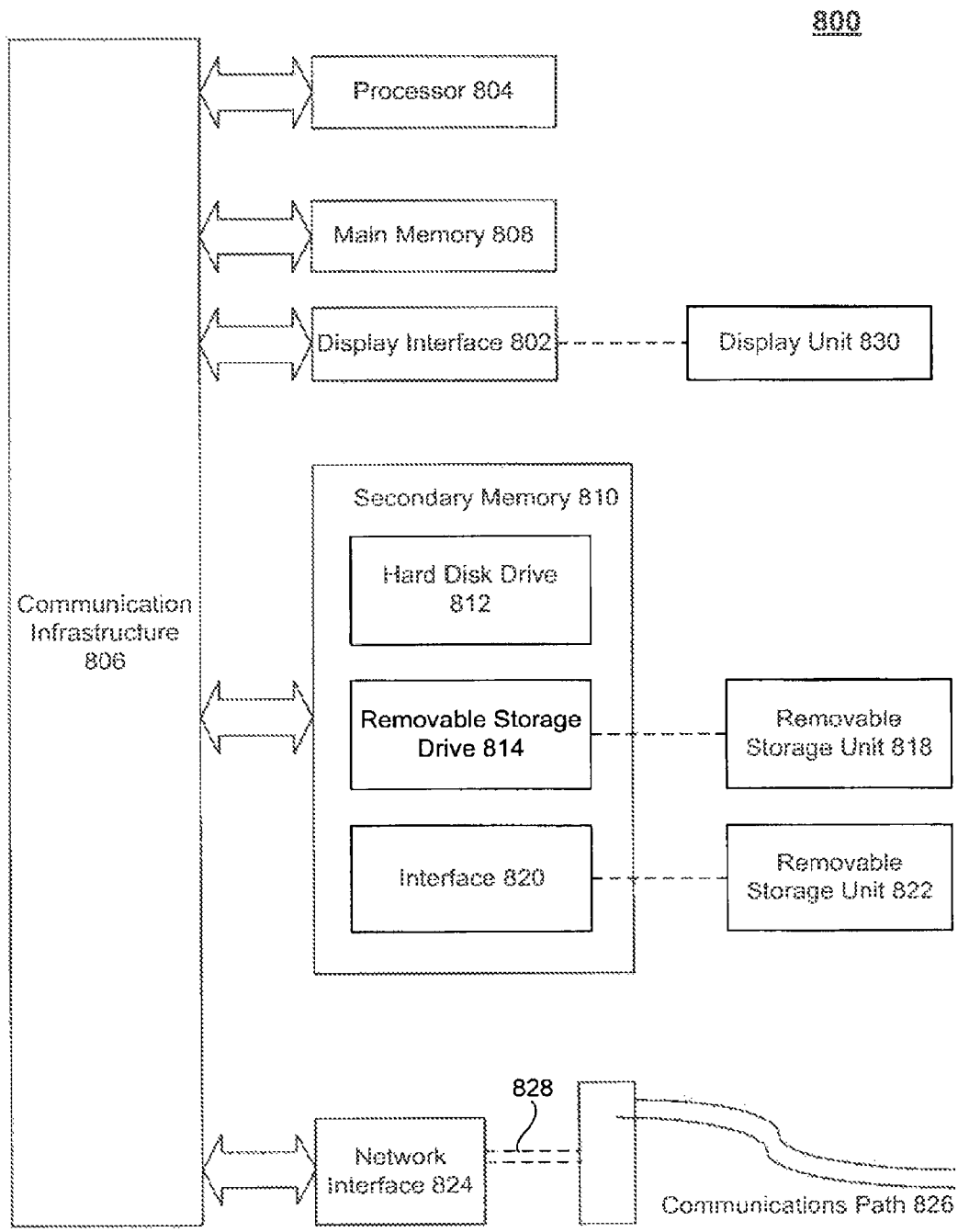
FIG. 8 is a diagram of an example computer system in which embodiments can be implemented.

FIG. 8 illustrates an example computer system 800 in which embodiments of the present invention, or portions thereof, may be implemented as computer-readable code. For example, system 100 of FIG. 1, can be implemented in computer system 800 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-7.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 800. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device. As will be appreciated by persons skilled in the relevant art, processor device 804 may also be a single processor in a multi-core/multiprocessor system, such system operating alone, or in a cluster of computing devices operating in a cluster or server farm. Processor device 804 is connected to a communication infrastructure 806, for example, a bus, message queue, network, or multi-core message-passing scheme.

Computer system 800 also includes a main memory 808, for example, random access memory (RAM), and may also include a secondary memory 810. Secondary memory 810 may include, for example, a hard disk drive 812, removable storage drive 814. Removable storage drive 814 may comprise a floppy disk drive, a magnetic tape drive, an optical disk drive, a flash memory, or the like. The removable storage drive 814 reads from and/or writes to a removable storage unit 818 in a well-known manner. Removable storage unit 818 may comprise a floppy disk, magnetic tape, optical disk, etc. which is read by and written to by removable storage drive 814. As will be appreciated by persons skilled in the relevant art, removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Communications interface 824 may include a modem, a network interface (such as an Ethernet card), a communications port, a PCMCIA slot and card, or the like. Software and data transferred via communications interface 824 may be in the form of signals, which may be electronic, electromagnetic, optical, or other signals capable of being received by communications interface 824. These signals may be provided to communications interface 824 via a communications path 826. Communications path 826 carries signals and may be implemented using wire or cable, fiber optics, a phone line, a cellular phone link, an RF link or other communications charnels.

In this document, the terms "computer program medium" and "computer usable medium" are used to generally refer to media such as removable storage unit 818, removable storage unit 822, and a hard disk installed in hard disk drive 812. Computer program medium and computer usable medium may also refer to memories, such as main memory 808 and secondary memory 810, which may be memory semiconductors (e.g. DRAMs, etc.).

Computer programs (also called computer control logic) are stored in main memory 808 and/or secondary memory 810. Computer programs may also be received via communications interface 824. Such computer programs, when executed, enable computer system 800 to implement the present invention as discussed herein. In particular, the computer programs, when executed, enable processor device 804 to implement the processes of the present invention, such as the stages in the methods illustrated by FIG. 7, discussed above. Accordingly, such computer programs represent controllers of the computer system 800. Where the invention is implemented using software, the software may be stored in a computer program product and loaded into computer system 800 using removable storage drive 814, interface 820, and hard disk drive 812, or communications interface 824.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMs, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

VI. CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. By way of example, although the description describes the use of a cache node as the coordinator, when the fabric is implemented with separate control functionality, e.g., Sybase Control Center in an ASE environment, such functionality can be utilized for backup and restore processing coordination. Further, it is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method, comprising:
   receiving, by a coordinator node, a request to initiate a synchronized backup operation of a partition of an in-memory database, wherein data of the partition is distributed across a first database on a first node and a second database on a second node, the first database including a first transaction log and first data pages, and the second database including a second transaction log and second data pages, wherein the synchronized backup operation comprises a database pages phase, a flushed pages phase, and a scan log phase, and wherein additional data of the in-memory database is stored on a third database on a third node;
   performing the database pages phase on the first node while the first data pages remain modifiable and on the second node while the second data pages remain modifiable, wherein the database pages phase comprises copying the respective database to a storage device;

receiving, by the coordinator node, a second completion notification indicating completion of the database pages phase by the second node;

performing, by the second node, the flushed pages phase subsequent to receiving the second completion notification from the second note and in parallel with the first node performing the database pages phase, the flushed pages phase comprising copying second data pages that have been modified prior to receiving a first completion notification from the first node;

receiving, by the coordinator node, the first completion notification indicating a completion of the database pages phase by the first node;

blocking online activity for the first and second nodes after the receiving of the first completion notification, wherein the third node continues operating while the first and second nodes are blocked;

unblocking online activity for the first and second nodes upon determining a common end point based on a time that the first completion notification and the second completion notification were received, wherein the common end point is representative of a transactionally consistent time of the synchronized backup of the database; and performing the scan log phase on the first and second nodes until the common end point is reached, wherein the scan log phase copies transaction in the first and second transaction logs that occurred prior to the common end point to the storage device.

2. The method of claim 1 wherein performing the synchronized backup operation further comprises utilizing a node from a database environment including the first and second nodes as the coordinator node.

3. The method of claim 1, wherein the second data pages copied during the flushed pages phase are associated with unlogged operations.

4. The method of claim 1, wherein the request to initiate the synchronized backup operation of the database enables recovery of the database to the common end point determined to be a time after the receiving of the completion notifications.

5. The method of claim 1, further comprising:
determining a transaction that did not complete prior to the common end point on either the first node or the second node; and
rolling back the respective database to prior to the transaction that did not complete.

6. A system comprising:
a database distributed across a first database on a first node and a second database on a second node, the first database including a first transaction log and first data pages, and the second database including a second transaction log and second data pages; and
a coordinator processing node configured to:
receive a request to initiate a synchronized backup operation of a partition of the distributed database, wherein data of the partition is distributed across the first node and the second node, wherein the synchronized backup operation comprises a database pages phase, a flushed pages phase, and a scan log phase, and wherein additional data of the distributed database is stored on a third database on a third node;
request, in response to receiving the request to initiate the synchronized backup, the first node to perform the database pages phase on the first node while the first data pages remain modifiable and the second node to perform the database pages phase while the second data pages remain modifiable, wherein the database pages phase comprises copying the first database to a storage device;

receive, from the second node, a second completion notification indicating a completion of the database pages phase by the second node;

perform, by the second node the flushed pages phase subsequent to receiving the second completion notification and in parallel with the first node performing the database pages phase, the flushed pages phase comprising copying the second data pages that have been modified prior to receiving a first completion notification;

receive the first completion notification indicating completion of the database pages phase by the first node;

request the first and the second nodes to block online activity after the receiving the first completion notification, wherein the third node continues operating while the first and second nodes are blocked;

request the first and second node to unblock online activity upon determining a common end point based on a time that the first completion notification and the second completion notification were received, wherein the common end point is representative of a transactionally consistent time of the synchronized backup of the database; and request the first and second nodes to perform the scan log phase until the common end point is reached, the scan log phase copying transactions in the first and second transaction logs that occurred prior to the common end point to the storage device.

7. The system of claim 6 wherein the database further comprises an in-memory database.

8. The system of claim 6, wherein the second data pages copied during the second flushed pages phase are associated with unlogged operations.

9. The system of claim 6, wherein the request initiate the synchronized backup operation of the database enables recovery of the database to the common end point determined to be a time after thy: receiving of the completion notifications.

10. A non-transitory computer-readable storage device having instructions stored thereon that, when executed by a coordinator node comprising a computing device, cause the computing device to perform operations comprising:
receiving, by the coordinator node, a request to initiate a synchronized backup operation of a partition of an in-memory database, wherein data of the partition is distributed across a first database on a first node and a second database on a second node, the first database including a first transaction log and first data pages, and the second database including a second transaction log and second data pages, wherein the synchronized backup comprises a database pages phase, a flushed pages phase, and a scan log phase, and wherein additional data of the in-memory database is stored on a third database on a third node:

performing the database pages phase on the first node while the first data pages remain modifiable and on the second node while the second data pages remain modifiable, wherein the database pages phase comprises copying the respective database to a storage device;

receiving, by the coordinator node, a second completion notification indicating a completion of the database pages phase by the second node;

performing, by the second node, the flushed pages phase subsequent to the receiving the second completion notification from the second node and in parallel with the first node performing the database pages phase, the flushed pages phase comprising copying second data pages that have been modified prior to receiving a first completion notification from the first node;

receiving, by the coordinator node, the first completion notification indicating a completion of the database pages phase by the first node;

blocking online activity for the first and the second nodes after the receiving the first completion notification, wherein the third node continues operating while the first and second nodes are blocked;

unblocking online activity for the first and second nodes upon determining a common end point based on a time that the first completion notification and the second completion notification were received, wherein the common end point is representative of a transactionally consistent time of the synchronized backup of the database; and performing the scan log phase on the first and second nodes until the common end point is reached, wherein the scan log phase copies transactions in the first and second transaction logs that occurred prior to the common end point to the storage device.

11. The computer-readable storage device of claim 10 wherein performing the synchronized backup operation further comprises utilizing a node from a database environment including the first and second nodes as the coordinator node.

* * * * *